Patented Jan. 26, 1937

2,069,096

UNITED STATES PATENT OFFICE 2,069,096

DERIVATIVES OF OVARIAN FOLLICULAR HORMONES AND PROCESS OF OBTAINING SAME

Donald W. MacCorquodale and Sidney A. Thayer, St. Louis, and Edward A. Doisy, Webster Groves, Mo., assignors to President and Board of Trustees of St. Louis University, St. Louis, Mo.

No Drawing. Application August 9, 1933, Serial No. 684,394

5 Claims. (Cl. 260—110)

The invention relates to certain new chemical substances and more particularly to oxidation products of the beta ovarian hormone and its simple chemical equivalents. In general, the new substances of our invention have estrogenic activity.

Our invention is based on the discovery that substances can be obtained by oxidizing under controlled conditions the ovarian follicular hormones obtained from natural sources. We have discovered that it is desirable to protect the phenolic group from oxidation either by selection of an oxidation method which will act preferentially on other portions of the molecule or by chemically treating said phenolic group to convert the same to a form more resistant to oxidation. Thus the beta ovarian hormone, $C_{18}H_{24}O_3$, may be treated by fusion with potassium hydroxide in order to obtain an oxidized compound or it may be first converted into the methyl ether derivative and then oxidized with permanganate to obtain another oxidation product which in turn may be reconverted into a compound having the phenolic hydroxyl group.

Our invention contemplates a large class of compounds which may be described as the oxidation products of the ovarian follicular hormones and/or such derivatives as have the phenolic hydroxyl group protected, which oxidation products have at least 2 of the 4 rings of the original compound intact. Examples of various compounds representative of the class are hereinafter given.

*Example 1.*—Method of preparing phenolic dibasic acid, $C_{18}H_{22}O_5$, from the beta ovarian follicular hormone, $C_{18}H_{24}O_3$.

500 mg. of the beta ovarian follicular hormone were stirred into a melt of 10 gm. of potassium hydroxide and 1.5 cc. of water in a nickel crucible held at 275° in a bath of fused sodium and potassium nitrates. Heating at this temperature was continued for 1 hour with occasional stirring. After the melt had cooled it was dissolved in water and filtered from a small amount of nickel oxide. Saturation of the solution with carbon dioxide resulted in the precipitation of about 50 mg. of beta hormone which was removed by filtration. The filtrate was acidified with sulfuric acid, cooled thoroughly, and the precipitated acid filtered off, washed with water and dissolved in 95% alcohol. The light-brown solution was treated with norit and the acid subsequently crystallized from dilute alcohol. A very effective means of purification was found in the precipitation of the potassium salt from absolute alcohol. The material was dissolved in absolute alcohol and treated with a solution of potassium hydroxide in absolute alcohol. The granular white potassium salt was filtered off, washed with absolute alcohol, dissolved in water, and the acid precipitated by means of hydrochloric acid. The yield of acid thus obtained was 330 mg. By repeated crystallization from dilute alcohol, with the use of norit when necessary, the acid was obtained in the form of beautiful large white needle-like plates which contained 1 molecule of water of hydration which was removed by heating in a vacuum at 135° over phosphorus pentoxide, or by standing over sulfuric acid. The anhydrous acid melted at 210—211°.

$C_{18}H_{22}O_5$ Calculated C 67.88, H 6.97, mol. wt. 318
Found C 67.35, 67.55, H 7.03, 6.88, mol. wt. 318, 320

$C_{18}H_{22}O_5 \cdot H_2O$ Calculated $H_2O$ 5.36
Found $H_2O$ 4.73, 4.88

The new compound probably has the condensed structural formula, $HOC_{16}H_{19}(CO_2H)_2$.

Another method for producing the same compound, $C_{18}H_{22}O_5$, is to first alkylate the beta hormone thereby obtaining an alkyl ether of the beta hormone. This compound is then oxidized by permanganate in a manner hereinafter more fully set forth and is subsequently hydrolyzed by fusion with caustic potash or other suitable methods commonly used for hydrolysis of ethers.

*Example 2.*—Method used in preparing an oxidized product, $C_{17}H_{22}O_3$, from the alpha ovarian follicular hormone, $C_{18}H_{22}O_2$.

100 mg. of the alpha ovarian follicular hormone, $C_{18}H_{22}O_2$, were fused with 5.0 gm. of potassium hydroxide and 0.75 cc. of water in a nickel crucible at 275° for 1¼ hours. The brown fusion was dissolved in water and filtered, the filtrate saturated with carbon dioxide, and the white gelatinous precipitate separated by filtration. The filtrate was concentrated somewhat on the water bath and then acidified with concentrated hydrochloric acid. The white precipitate thus obtained was dissolved in 95% alcohol, the solution decolorized with norit, and then concentrated on the water bath. On dilution with water and cooling, fine white crystals were obtained. Recrystallization of this product from dilute alcohol gave 20.5 mg. of fine white needles which melted sharply at 195°.

$C_{17}H_{22}O_3$ Calculated C 74.40, H 8.09
Found C 74.49, 74.40, 74.24, H 8.51, 8.20, 8.10

The acid readily reddens litmus paper when in dilute alcoholic solution. Its phenolic character is indicated by the formation of an orange-red dye when its alkaline solution is treated with diazotized sulfanilic acid.

*Example 3.*—Method used in preparing an oxidation product, $C_{19}H_{24}O_5$, designated as the methyl ether of the above phenolic dibasic acid.

575 mg. of acid, $C_{18}H_{22}O_5$, (Example 1) were dissolved in 15 cc. of methyl alcohol and 2 cc. of redistilled dimethyl sulfate added. 15 cc. of 25% potassium hydroxide were added and the mixture was heated in an oil bath at 110°, under a reflux condenser for ½ hour. Then 1 cc. of dimethyl sulfate and 10 cc. of potassium hydroxide were added and the heating was continued for 2 hours. A small amount of ester separated as an oil and this was saponified by further heating with additional alkali. The cold solution was acidified with hydrochloric acid forming a white precipitate. This was filtered off, dissolved in methyl alcohol, and treated with norit to remove a small amount of color. After two recrystallizations from dilute methyl alcohol the yield of white crystalline product was 538 mg. Further recrystallization from the same solvent gave a product which melted at 200–201°.

$C_{19}H_{24}O_5$ Calculated C 68.63, H 7.28, $CH_3O$ 9.33 mol. wt. 332
Found C 68.49, 68.59, H 7.1, 7.1, $CH_3O$ 9.68, 9.70, 9.33, mol. wt., calculated from $CH_3O$ value, 324

Example 4.—Another method used in preparing $C_{19}H_{24}O_5$.

Another method for preparing the methyl ether of the phenolic dibasic acid is to convert the beta ovarian follicular hormone into the methyl ether thereby protecting the phenolic hydroxyl group and subsequently oxidize with permanganate. This process produces the previously described compound, $C_{19}H_{24}O_5$, and also another compound, $C_{18}H_{22}O_3$ (see Example 5). The method used is as follows:

4.438 gm. of the methyl ether of the beta ovarian follicular hormone were dissolved in 800 cc. of dry acetone, and pulverized potassium permanganate was added to the solution in small portions as the oxidation proceeded. At first the reaction was slow but the speed of reaction increased after the oxidation was well started. When permanganate equivalent to 3 atoms of available oxygen had been consumed, the reaction slackened perceptibly and after 0.55 gm. additional had been added, the reaction stopped. After standing for 24 hours the supernatant liquid was colorless. It was separated by filtration and the residue washed with dry acetone.

The residue was leached thoroughly with normal KOH solution and then with water. Acidification of these combined washings with dilute sulfuric acid precipitated a brown gummy mass which gradually hardened on standing. The precipitate was washed thoroughly with water and dried. The weight was about 4 gm. It was dissolved in absolute alcohol and treated with an absolute alcoholic solution of potassium hydroxide. A light-brown granular salt separated from the dark-brown solution. It was filtered off, the filtrate being reserved for further purification as hereinafter described. The light-brown granular salt was washed with absolute alcohol and then with dry ether. It was then dissolved in water and the solution acidified with hydrochloric acid, whereupon a brown gummy mass separated which gradually hardened on standing. This was washed thoroughly with water and was then dissolved in methyl alcohol and treated with norit. The filtrate, which still contained some color, was evaporated to dryness and the residue dissolved in hot glacial acetic acid. About 2 volumes of water were added to the hot solution, which on cooling deposited a brown crystalline solid. This was dissolved in methyl alcohol and decolorized with norit. Upon dilution with water and evaporation of some of the alcohol the solution deposited white crystals which when dried had a melting point of 192° (uncorrected). The product is the same as produced in Example 3 and has the formula, $C_{19}H_{24}O_5$. The yield was 1.79 gm.

Example 5.—A method used in preparing $C_{18}H_{22}O_3$ from the filtrate of Example 4.

The reserved alcoholic filtrate from the precipitated potassium salt was diluted with water and heated on the water bath to remove alcohol. Upon acidification with hydrochloric acid a brown gummy mass precipitated. This was washed, dried and treated with methyl alcohol, whereupon most of the material dissolved, leaving a difficultly soluble crystalline mass. This material was washed with cold methyl alcohol and then dissolved in about 25 cc. of hot ethyl alcohol and decolorized with norit. The filtrate was concentrated to 4 cc. on the water bath, and on cooling deposited sheaves of long, well-formed, needle-like plates. The yield was 175 mg. and the melting point 182°.

$C_{18}H_{22}O_3$ Calculated C 75.47, H 7.75, $CH_3O$ 10.81
Found C 75.70, 75.84, H 7.60, 7.68, $CH_3O$ 10.76, 10.97

Example 6.—Method used in preparing $C_{19}H_{22}O_5$ from the product, $C_{19}H_{24}O_5$, of Example 3.

572 mg. of the acid, $C_{19}H_{24}O_5$ (melting point 194°, uncorrected), were dissolved with warming in a solution of 500 mg. of potassium carbonate in 50 cc. of water. At room temperature this solution was cautiously treated with a 0.1 N potassium permanganate solution, at first drop-by-drop with shaking, and then 10 cc. at a time, each time after the previous portion had been completely reduced. Toward the end the reaction slackened and the permanganate was added more rapidly. In all, 410 cc. were added. After standing at room temperature for 2 hours the solution contained only a trace of permanganate and this was reduced by warming on the water bath. The manganese dioxide was removed by filtration and the filtrate concentrated on the water bath to a small volume and then acidified with dilute sulfuric acid. The brown resinous precipitate was dissolved in ethyl alcohol and treated with norit but it could not be induced to crystallize. It was then dissolved in absolute alcohol and treated with an absolute alcohol solution of potassium hydroxide. The brown potassium salt thus obtained was dissolved in water and the acid precipitated by means of dilute hydrochloric acid. Repeated crystallization of this from dilute alcohol finally yielded a small amount of white crystalline acid which melted at 234–235°.

$C_{19}H_{22}O_5$ Calculated C 69.05, H 6.72, $CH_3O$ 9.4
Found C 69.19, 68.60, H 6.6, 6.8, $CH_3O$ 9.5 9.5.

0.0101 gm. required 1.21 cc. of alkali (neutralizing factor=0.04885).

Neutralization equivalent calculated for the dibasic acid, $C_{19}H_{22}O_5$, was 165; found, 167.

Example 7.—Method used in preparing another oxidation product, $C_{18}H_{18}O_5$, from $C_{19}H_{24}O_5$.

By means of a different oxidation process we have been able to obtain another compound, $C_{18}H_{18}O_5$, from product, $C_{19}H_{24}O_5$, of Example 3. The method is as follows:

1.843 gm. of the acid, $C_{19}H_{24}O_5$, were dissolved in 50 cc. of glacial acetic acid and oxidized with a solution made by dissolving 5.445 gm. of potassium dichromate and 4.5 cc. of concentrated sulfuric acid in 50% acetic acid and diluting to 50 cc. The oxidizing solution was at first added slowly at room temperature and after the reaction slackened it was added in 5 cc. portions and the mixture warmed on the water bath. The total volume of oxidizing solution used was 41 cc. The mixture was warmed on the water bath until the chromate was completely reduced and it was then diluted with about 4 volumes of water and set in the ice box to cool. The light-brown granular precipitate which separated was filtered off, dissolved in 75 cc. of 95% alcohol, and treated with norit. The filtered solution was concentrated to 10 cc. and on cooling deposited fine white needles. The yield was 75 mg. and the melting point 243–244°.

$C_{18}H_{18}O_5$ Calculated C 68.76 H 5.77, $CH_3O$ 9.87
Found C 68.94, 68.86, H 5.88, 5.99, $CH_3O$ 9.60 9.90.

The substance is neutral to litmus and insoluble in cold alkali but on prolonged heating it passes slowly into solution. It does not react with semicarbazide or with hydroxylamine. The neutralization equivalent was determined by heating the substance with an excess of standard alkali and titrating the excess base with acid. The value obtained, 175, indicates that the substance is the dilactone of a dihydroxy dibasic acid. The calculated value for the neutralization equivalent is 157.

All of the products previously described are crystalline substances in which the phenolic hydroxyl group has not been oxidized although the products all represent oxidation degradation compounds compared with the natural ovarian hormones. It is characteristic of the new series of compounds that at least 2 of the 4 rings of the ovarian hormone are still intact. While the compounds specifically described have usually been in the form of the acid substance, it is to be understood that the corresponding metal salts can readily be prepared in the usual manner and our invention contemplates the alkali, alkaline earth metal and heavy metal salts as well. In general, the sodium salts are desirable for making solutions for therapeutic purposes. However, other salts and the acid substances themselves or their derivatives such as esters and amides may be used; in fact, any derivatives which readily split-down into these carboxylic acids may be administered without departing from the spirit of this invention. While we have indicated that our invention contemplates the protection of the phenolic hydroxyl group by methylation, it is to be understood that there are many equivalent methods of obtaining the same results. For example, the methods of esterification or etherification may be used. Any alkyl compound may be substituted for the methyl compound such as the ethyl and propyl derivatives. Furthermore, acids such as acetic or benzoic acid may be used to form the acetyl or benzoyl compounds prior to the oxidation step. Thus the process outlined above will obviously suggest many other equivalents, all of which come within the purview of the invention.

It is also understood that in lieu of the oxidation by permanganate and chromic acid, other oxidation methods may be used which will not break-down the protected phenolic portion of the molecule. Also, other less violent oxidation methods may be employed when compounds are treated which do not have the phenolic hydroxyl protected.

The complete structural formula of the ovarian hormones and the class of new derivatives herein described and claimed is not definitely known. It is believed, however, that the beta hormone, $C_{18}H_{24}O_3$, may be designated as

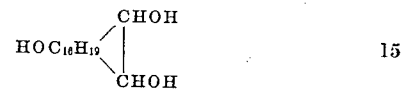

Correspondingly the formula of the acid compound, $C_{18}H_{22}O_5$, of Example 1 is probably

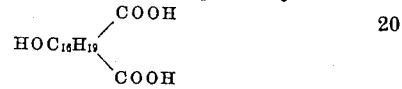

The alpha hormone, $C_{18}H_{22}O_2$, has the condensed formula

The compound of Exmple 2, $C_{17}H_{22}O_3$, has the condensed structural formula

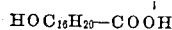

The compound of Examples 3 and 4, $C_{19}H_{24}O_5$, has formula

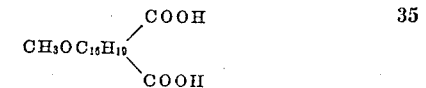

Example 5, $C_{18}H_{22}O_3$, is

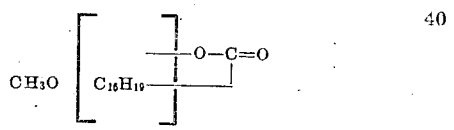

Example 6, $C_{19}H_{22}O_5$, is

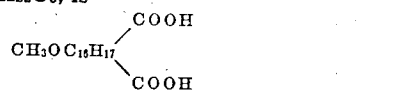

Example 7, $C_{18}H_{18}O_5$, is

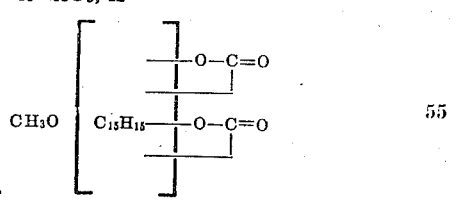

What we claim as our invention is:
1. The phenol type compounds

$$X{-}OC_{16}H_{19}(CO_2H)_2$$

where X is H or a radical capable of protecting the phenolic group against oxidizing agents and the radical $C_{16}H_{19}$ has the same structure as in the beta ovarian hormone.

2. The methyl ether of phenolic dibasic acid, $C_{18}H_{22}O_5$, a white crystalline product having a melting point of 200–201° and formula $C_{19}H_{24}O_5$.

3. Oxidation products of a member of the group consisting of the beta-ovarian hormone and its simple chemical equivalents having the phenolic OH of the hormone protected against oxidation, wherein said oxidation products still possess at least two of the four rings of the original unoxidized substance, and wherein the phenolic ring is unoxidized, being solids of definite melting points when in the pure state and containing at least one carboxylic acid group.

4. Oxidation products of a member of the group consisting of the beta-ovarian hormone and its simple chemical equivalents having the phenolic OH of the hormone protected against oxidation, wherein said oxidation products still possess at least two of the four rings of the original unoxidized substance, and wherein the phenolic ring is unoxidized, being solids of definite melting points when in the pure state, possessing at least one carboxylic acid group and not less than fifteen carbon atoms in the free phenol part of the compounds.

5. The process comprising reacting a member of the group consisting of an ovarian follicular hormone and its simple chemical equivalent having the phenolic OH of the hormone protected against oxidation, with an oxidizing agent capable of oxidizing the hormone substance to a carboxylic acid containing at least two of the four rings of the original hormone, including the phenolic ring.

DONALD W. MacCORQUODALE.
SIDNEY A. THAYER.
EDWARD A. DOISY.